(No Model.) 3 Sheets—Sheet 2.

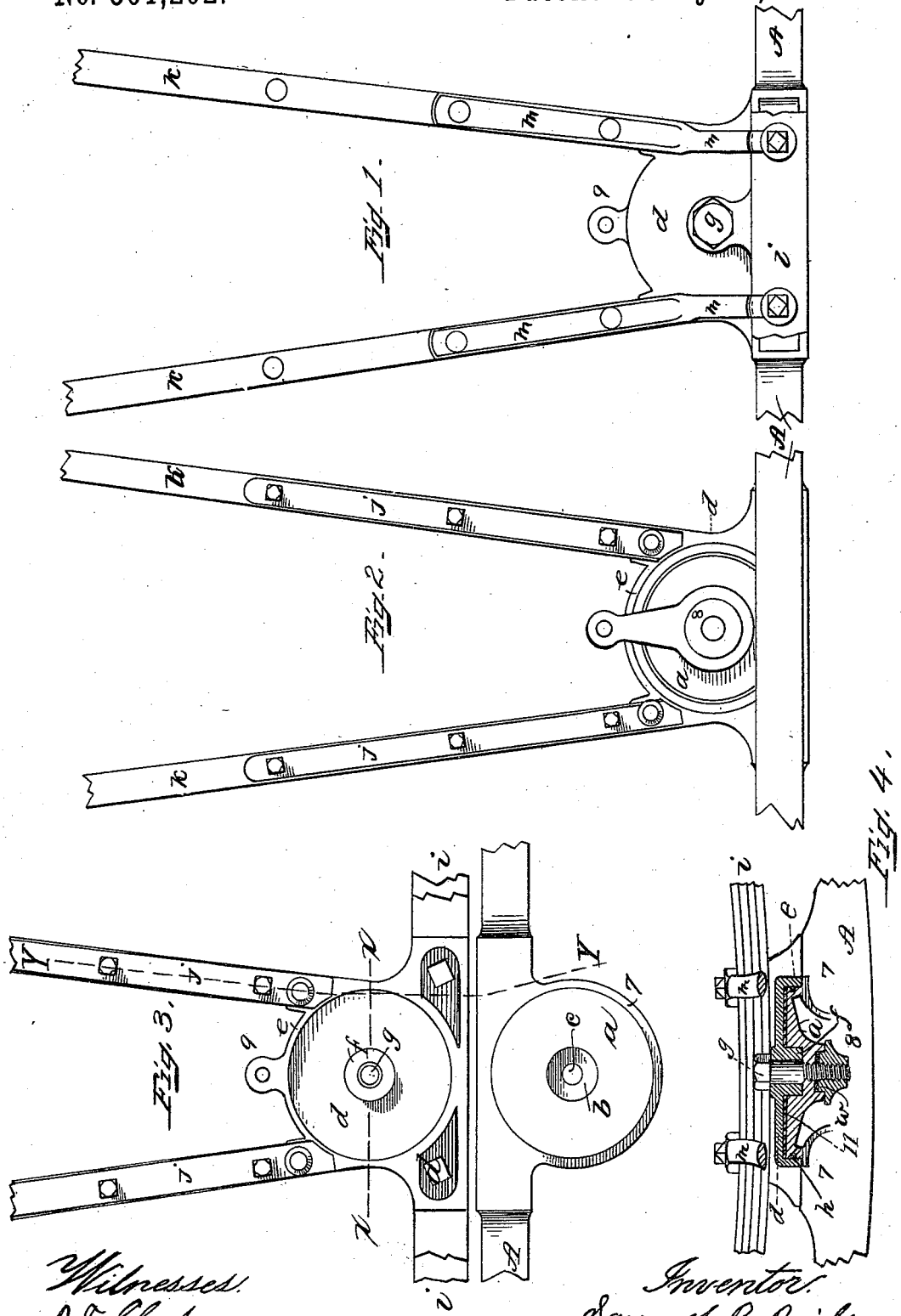

S. R. BAILEY.
CARRIAGE COUPLING.

No. 501,202. Patented July 11, 1893.

Witnesses
J. T. Clarkson
H. C. Renick Jr.

Inventor
Samuel R. Bailey
per T. W. Porter Atty (No Model.)  3 Sheets—Sheet 3.

S. R. BAILEY.
CARRIAGE COUPLING.

No. 501,202. Patented July 11, 1893.

Witnesses.
J. N. Clarkson
H. E. Remick

Inventor.
Samuel R. Bailey
per J. W. Porter Atty

UNITED STATES PATENT OFFICE.

SAMUEL R. BAILEY, OF AMESBURY, MASSACHUSETTS.

CARRIAGE-COUPLING.

SPECIFICATION forming part of Letters Patent No. 501,202, dated July 11, 1893.

Application filed October 8, 1892. Serial No. 448,214. (No model.)

*To all whom it may concern:*

Be it known that I, SAMUEL R. BAILEY, of Amesbury, in the county of Essex and State of Massachusetts, have invented a new and useful Improvement in Carriage-Underworks, which will, in connection with the accompanying drawings, be hereinafter fully described, and specifically defined in the appended claims.

Figure 5:
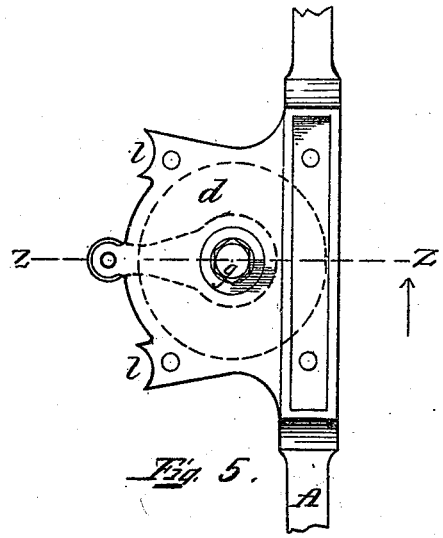
Figure 6:
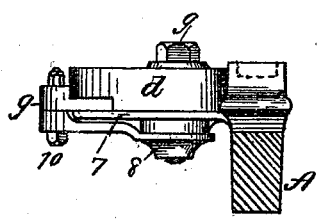
Figure 7:
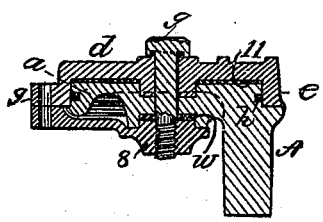
Figure 10:
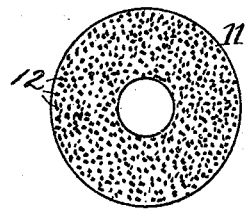
Figure 8:
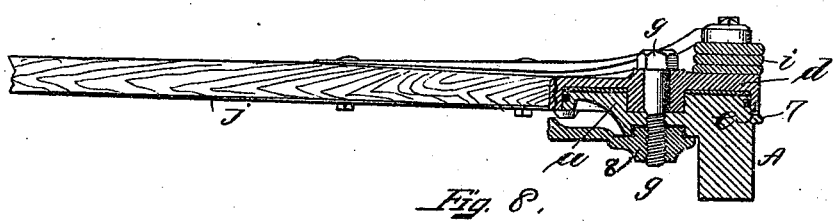
Figure 9:
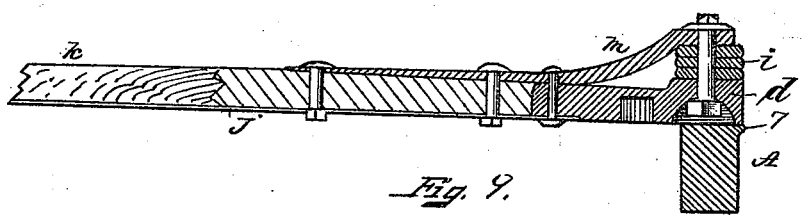

In said drawings Figure 1 is a top plan of my coupling. Fig. 2 is an under side plan view of the parts shown in Fig. 1. Fig. 3 shows the two halves of the coupling separated, with the upper part upside down. Fig. 4 is a section as on line X Fig. 3, taken as looking to the front. Fig. 5 is a plan view of the coupling as separated from all the other parts except the central portion of the forward axle with which the lower half of the coupling is formed integral. Fig. 6 is a side elevation of Fig. 3. Fig. 7 is a section on line Z Fig. 5. Fig. 8 is a section on line Z, Fig. 5, but showing one of the perches in elevation. Fig. 9 is a section on line Y, Fig. 3, but with the halves of the coupling closed together. Fig. 10 is a plan view of the anti-friction disk interposed in the coupling that connects the hind and front axles.

The object of my invention is to provide a disk-like coupling to connect together the front and rear under-works of carriages, which shall avoid the serious objections that exist to the common fifth wheel, and which shall be compact, neat, strong and durable; all as will be next described and then specified in the claims.

Referring again to said drawings, A represents the front axle which has formed upon it, at its center, the lower half $a$, of the coupling, the center of which is in rear of the axle as shown. This half of the coupling is raised somewhat above the axle, and it has an outline which is a true circle, and is formed with a central depression $b$ and bolt hole $c$, as also with a laterally extended flange 7 at its outer edge.

The upper half of the coupling is shown at $d$ and is formed with a depending flange $e$, that encircles coupling $a$, with the exception of flange 7, as shown. Central to $d$, is formed the boss $f$, that fits in depression $b$ in part $a$, and the bolt $g$, passes down through parts $a$ and $d$ and is threaded in the nut 8 that is recessed in part $a$, with a packing $w$ interposed between them; a shank of said nut extending rearward is bolted to ear 9, formed upon part $d$; so that part $a$ may turn in its position without a tendency to release said nut 8. The part $d$ is, at its front, formed to receive the spring $i$, that is bolted to it and it is also formed to receive the lower perch straps $j$ that are riveted to it as shown. The perches $k$ bear against proper seats $l$ formed upon coupling $d$, and are bolted between straps $j$ and stays $m$ that pass from the perch up onto spring $i$ and receive the spring bolts as shown.

To prevent friction between parts $a$ and $d$ of the coupling, I interpose between them a disk shown at 11, in Figs. 7 and 8 in the coupling, and at Fig. 10 in plan. Said disk is formed of vulcanized fiber, so called, and is at the numerous points or spots thereon filled with plumbago to further decrease friction in the coupling. In the peripheral face of part $a$, I form a circumferential groove $h$, which serves to arrest all dirt that can by any means enter between parts $a$ and $d$, and tend to move upward between them. In Figs. 4 and 7, an anti-friction packing $w$ is shown as interposed between part $a$ and nut 8, to prevent wear and friction of the parts. Said packing may be formed of vulcanized fiber or other anti-friction material, and like disk 11 it may be formed with perforations filled with plumbago.

Instead of forming the coupling $a$ to receive the shear perches, as shown, it may be formed to receive a center perch instead, as both classes or kinds of perches are equally well known.

I claim as my invention—

1. The halves of a carriage coupling formed as an upper and under disk, the lower disk being formed integral with the axle and mainly in rear thereof, so that the transom bolt is in rear of the axle, and the upper disk being formed with an integral seat for the front spring, substantially as specified.

2. The lower half of a vehicle coupling formed integral with the axle and raised above the same to receive the upper half of the coupling, and extending from near the front to the rear of the axle so that the king bolt is in rear thereof, substantially as specified.

3. The upper half of a carriage coupling, formed with an inclosing wall to receive the raised portion of the lower half of the coupling, with a duly curved seat for the transverse spring $i$ that rests thereon; and with seats formed outside of the wall that receives the lower half of the coupling, to receive the abutting ends of the perches which are confined between the irons $j$, and $m$, substantially as specified.

4. The half of a carriage coupling formed with a circumferential groove $h$, to serve as a dust and dirt arrester, substantially as specified.

5. In a carriage coupling formed with an upper and under disk an interposed removable disk of vulcanized fiber charged with plumbago to serve as an antifriction bearing, substantially as specified.

6. In combination with the halves $a$ $d$ of a carriage coupling, the nut 8, fitted to part $a$ and extended to the rear thereof, and formed with a bolt hole; the part $d$ formed with a perforated ear 9, the bolt 10, fitted in said parts, and king bolt $g$, all substantially as specified.

7. The combination of part $d$ of a carriage coupling fitted upon part $a$, and the nut 8, also fitted to part $a$, and extended to and fitted to the rear thereof, substantially as specified.

SAMUEL R. BAILEY.

Witnesses:
L. W. HOWES,
T. W. PORTER.